May 19, 1931.  K. NAGAO  1,806,488

DOOR OPENING AND SHUTTING DEVICE FOR AUTOMOBILES

Filed Dec. 14, 1928

INVENTOR
Kikuro Nagao
BY
ATTORNEYS

Patented May 19, 1931

1,806,488

UNITED STATES PATENT OFFICE

KIKURO NAGAO, OF KAMISONOCHO, NISHIKU, NAGOYA, JAPAN

DOOR OPENING AND SHUTTING DEVICE FOR AUTOMOBILES

Application filed December 14, 1928, Serial No. 326,104, and in Japan January 26, 1928.

This invention relates to a door opening and shutting device for an automobile. Though of a comparatively simple construction, the device according to the present invention enables the driver to open and shut the doors for the passengers' seats surely without leaving his seat, thereby preventing various accidents that may occur owing to the passenger carelessly opening the door while the car is moving.

Figure 1:
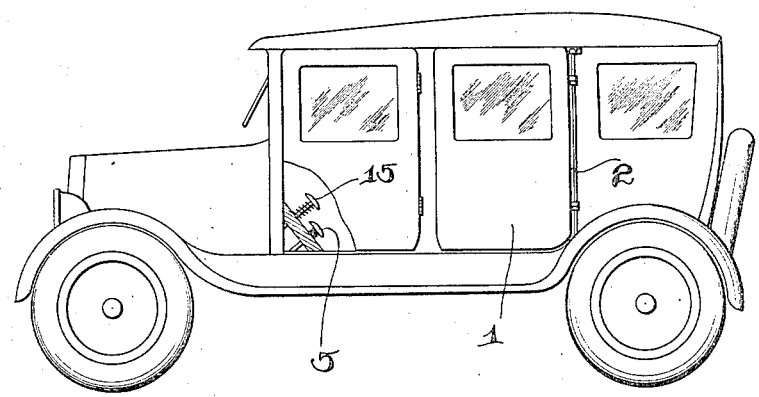
Figure 2:
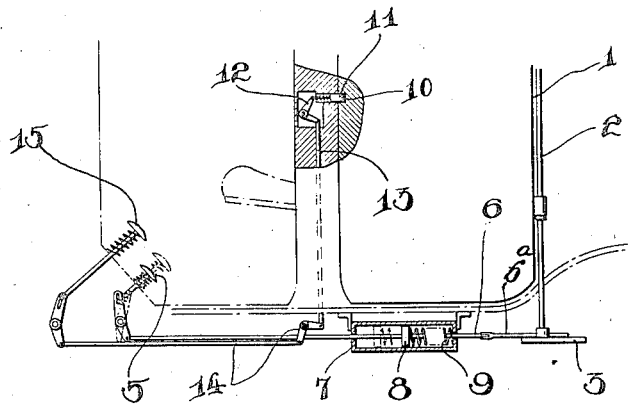
Figure 3:
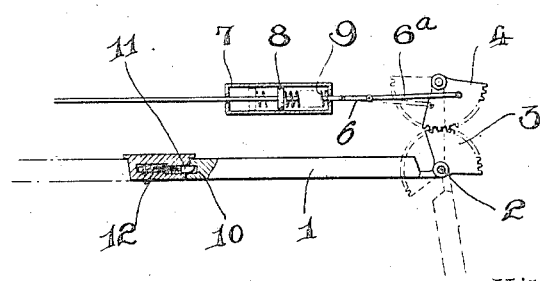

In the accompanying drawings, Fig. 1 shows a side view with partial sections of a car in which the device according to the present invention is employed. Fig. 2 shows a side detailed view of said device and Fig. 3 is a plan of the same.

A sector (3) is fixed to the end of the lower extension of the door supporting axis (2) hinged to the car body. One end of a connecting rod (6) is pivoted to a link 6ᵃ which is eccentrically connected to a sector (4) which is in mesh with said sector (3) and the other end is connected to a pedal (5) under the driver's seat through a crank. A box (7) is provided under the floor and, through it, the connecting rod (6) with a disk (8) attached thereto can move in the reverse directions while compressing or releasing the spring (9) which is contained in said box and bears against the disk (8).

Another pedal (15) provided near the pedal (5) is connected to a locking bolt (11) through suitable transmitting mechanisms such as connecting rods (13) and (14), a crank (12) and two other cranks. The crank (12) the locking bolt (11) and most part of the connecting rod (13) are contained inside the car frame. Said locking bolt (11) tends to protrude outward under the action of a spring and is made so as to fit into the corresponding recess (10) provided at the side edge of the door (1) so as to lock the latter.

The functions of the present device are as follows:

Suppose the door (1) is in the opened position as shown in the dotted lines in Fig. 3. Push the pedal (5) downward, and then the connecting rod (6) will be moved backward while compressing the spring (9) with the disk (8), and the sectors (4) and (3) will be rotated into the full line position in Fig. 3, whereby the door (1) will be shut through the rotation of the supporting axis (2).

The side edge of the door (1) will compel, before completely being shut, the bolt (11) to recede against the action of its associated spring, and again permit it to protrude and fit into the corresponding recess (10) so as to lock the door (1) in the completely shut position. While the door (1) is closed, the spring (9) remains in a compressed state and the pedal (5) remains in a depressed state as shown in Fig. 1.

To open the door (1), push the pedal (15) downward, and the locking bolt (11) will come out of the engagement with the recess (10) through the movements of the transmitting mechanisms such as (14) (13) (12) etc. The door (1) will be opened through the action of the spring (9) which has been compressed. The sectors (4) and (3) and the connecting rod (6) and link 6ᵃ will be moved in the opposite direction and bring the pedal (5) into the initial position.

As is clear from above, the present device is characterized in that the door is opened by the action of a spring which has been compressed during the closing of the door.

Having now particularly described and ascertained the nature of my said invention, and in what manner the same is to be performed, I declare that what I claim is:

1. An automobile having front and rear seats and a rear hinged door, a bolt for locking the door, said bolt being mounted in the automobile body so as not to be accessible to an occupant of the rear seat, means for operating the bolt by the operator on the front seat, a toothed sector on the pivot of the door, a second toothed sector adjacent the first sector and meshing therewith, a pedal adjacent the front seat, a hinged rod connected with the said pedal and eccentrically connected with the second sector, a spring on the rod, and means whereby the spring is put under compression in closing the door and held compressed while the door is closed, thereby permitting the door to be opened by the spring when the locking bolt is retracted.

2. An automobile having a pivoted door, a bolt for locking the door closed, a toothed sector on the pivot of the door, a second toothed sector mounted adjacent the first sector and meshing therewith, a pedal, a casing, a rod passing through the casing and having its front end connected with the pedal and its rear end connected to a link, said link being eccentrically connected to the second sector, a spring on the rod in the casing, and a disk on the rod in the casing and against which the spring bears, whereby the spring will be held compressed when the door is closed by the pedal to permit the door to be opened by the spring when the bolt is disengaged from the door.

3. The combination with an automobile body, a door hinged to the body having a recess for supporting the locking bolt, a sector fixed to the end of the lower extension of the door supporting axis, a pedal mounted on the body and operatively connected to the lock bolt through cranks and connecting rods, a sector in mesh with said first-named sector, a second pedal mounted on the body, a box attached to the floor of the automobile, a piston slidable therein and having a connecting rod projecting through opposite ends of said box, one end of said rod being connected to said second pedal, a link connected to the other end of said rod and providing a hinge joint, said link being eccentrically connected to said second named sector, and a spring interposed between said piston and one end of said box.

In testimony whereof I hereunto affix my signature.

KIKURO NAGAO.